Feb. 18, 1969 H. R. DOUGLAS ET AL 3,428,420
PREPARATION OF MAGNESIUM BISULFITE LIQUOR
Filed June 7, 1965
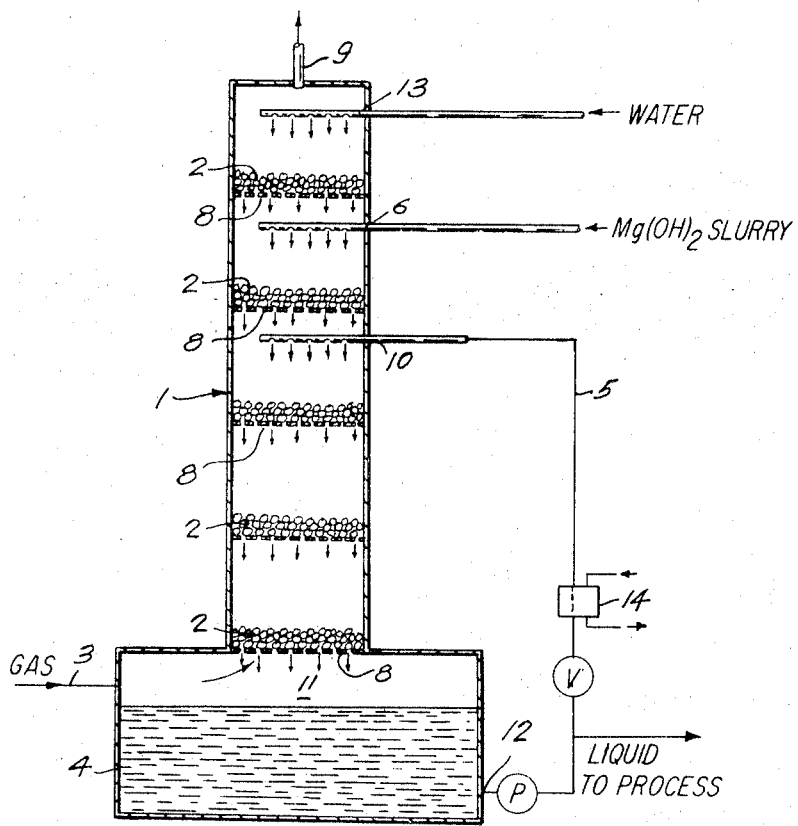
INVENTORS
Harold R. DOUGLAS
Ivan W. SNIDER
AGENT

United States Patent Office 3,428,420
Patented Feb. 18, 1969

3,428,420
PREPARATION OF MAGNESIUM
BISULFITE LIQUOR
Harold Roy Douglas, Hudson Heights, Quebec, and Ivan W. Snider, Cornwall, Ontario, Canada, assignors to Dominion Tar & Chemical Company, Limited, Montreal, Quebec, Canada
Filed June 7, 1965, Ser. No. 461,648
U.S. Cl. 23—132                    6 Claims
Int. Cl. C01b 17/42

ABSTRACT OF THE DISCLOSURE

A method of preparing magnesium bisulphite pulping liquor. $Mg(OH)_2$ slurry is added near the top of a tower and flowing downwards reacts with $SO_2$ gas flowing countercurrently to form $MgSO_3$, and the $MgSO_3$ so formed, in its downward flow, reacts with $SO_2$ to form $Mg(HSO_3)_2$. A high enough turbulence is created in the tower to enhance the reactions and prevent deposition of $MgSO_3$.

The present invention relates to the preparation of a magnesium bisulphite solution, more particularly to the preparation of a magnesium bisulphite solution suitable for use as a digesting liquor in the manufacture of pulp.

In the preparation of such magnesium bisulphite liquors the starting materials are generally sulphur dioxide and magnesium oxide or hydroxide. However, hitherto it has not been practicable to prepare such liquors for pulping by direct absorption of the sulphur dioxide gas in a magnesium hydroxide slurry and it has been necessary to proceed in a round-about way and by several stages. The difficulties encountered in the preparation of such liquors stem primarily from the fact that, whereas magnesium bisulphite is quite soluble in water, magnesium monosulphite, which will inevitably form first in a reaction between sulphur dioxide and magnesium hydroxide, has very limited solubility. Precipitation of the mono-sulphite will normally lead to the clogging of the equipment and other undesirable consequences. What adds to the difficulties is that it is generally desirable to prepare fairly concentrated solutions of magnesium bisulphite while the sulphur dioxide gas used is often very dilute gas., e.g., gas obtained from the combustion of waste liquor in a recovery furnace. To avoid the difficulties it has been the practice to conduct the operation in such a manner that magnesium hydroxide is introduced only into an already formed solution of magnesium bisulphite and the resulting monosulphite-bisulphite solution is used for further absorption of sulphur dioxide. Such practice has necessitated the addition of fresh magnesium hydroxide at several successive points along the path of the gas and has generally required a number of separate stages and corresponding reactors.

A method of preparing a magnesium bisulphite liquor is described in U.S. Patent 2,351,780. In this method, the magnesium hydroxide is reacted with a solution containing magnesium bisulphite to produce a solution of magnesium sulphite in magnesium bisulphite and this solution is, in turn, enriched in sulphur dioxide by further contact with the gas to produce a bisulphite solution; the alternation of the two steps leads to a liquor of the desired strength. However, for this method to function effectively, several reaction zones for treatment with magnesium hydroxide must be provided, several absorption towers for the absorption of gas must be used, and the magnesium hydroxide must be introduced at successive points to several reaction zones. Thus, the gas will enter first tower and after contact with the liquor therein will pass successively through the remaining two or three towers, while water is added to the reaction zone associated with the last tower and magnesium oxide is added to the reaction zones associated with each of the towers. The magnesium oxide reacts with the liquor in each of the reaction zones, and the solution is partly recirculated through the corresponding absorption tower and partly withdrawn into the next preceding reaction zone.

In another known arrangement, the magnesium hydroxide slurry and the sulphur dioxide are passed cocurrently through a venturi or like device wherein the liquid and gas become thoroughly mixed, and the mixture is passed into a separator. As with the previously described method, several venturis in series are required and the magnesium hydroxide must be introduced at several successive points in the system. Thus, the gas passing through the first venturi into the first separator will be mixed with a solution consisting partly of liquor recirculated from the first separator, partly of the liquor forwarded from the first separator, partly of the liquor forwarded from the second separator, and partly of fresh addition of magnesium hydroxide. After passing the first separator, the gas will be passed through a second venturi and into a second separator together with liquid consisting partly of liquor recirculated from the second separator, partly of liquor forwarded from the third separator and partly of first addition of magnesium hydroxide; and so on, until substantially all the sulphur dioxide gas is absorbed. It will be appreciated that such batteries of bulky separators are costly to build, difficult to operate and occupy considerable space in the mill.

It is the object of the present invention to provide a method of preparing magnesium bisulphite liquor suitable for pulping by the absorption of sulphur dioxide in a slurry of magnesium hydroxide in a single tower under conditions which allow substantially complete stripping of the sulphur dioxide and which permit the avoidance of undesirable deposits of the magnesium monosulphite. It is another object of the invention to provide such a method wherein the introduction of magnesium hydroxide into the tower for subsequent absorption of sulphur dioxide is effected substantially at a single point in the system.

According to this invention, magnesium bisulphite liquor is prepared by continuously introducing into a reaction zone at a predetermined rate gas containing sulphur dioxide at a point in the lower region thereof, introducing directly into said zone at a predetermined rate magnesium hydroxide slurry at a point in the upper region thereof thereby causing said gas and said slurry to flow in countercurrent, producing a condition of high turbulence in the flow of said gas and said slurry in at least a portion of said zone thereby to enhance absorption of said gas in said slurry and subsequent reaction between sulphur and magnesium hydroxide, the product of said reaction being preponderantly magnesium monosulphite in the upper region of said zone and being preponderantly magnesium bisulphite in the lower region of said zone, and collecting the liquor issuing from said lower region of said zone. The reaction zone may be constituted by a tower or the like wherein the gas and the slurry are passed in countercurrent at high velocity and wherein turbulence is enhanced, e.g., by the movement of a multiplicity of lightweight elements made to move in random distribution throughout a defined space in said reaction zone along free linear paths of substantial length. A description of an apparatus of this type and of the general method of operation is given in U.S. Patent No. 3,350,075. Other methods and apparatus for effecting contact between the gas and the slurry in conditions of high turbulence are also known.

The preparation of bisulphite liquor by absorption of sulphur dioxide gas in magnesium hydroxide slurry according to this invention depends for successful operation on the coordination of a number of variables in a manner to be presently discused. First, an adequate balance of gas and liquid mass rates should be maintained so as to maintain the proper stoichiometric ratio between $SO_2$ and $Mg(OH)_2$ and also, when the method of contacting fluids referred to above is used, to ensure sufficient liquid loading in the absorption zone and to produce random motion of the lightweight element and the ensuing turbulence. The maintaining of a proper liquid to gas ratio may, in certain conditions, involve recirculation of the formed bisulphite liquor. Another variable of importance in the practice of the invention is the temperature of operation which will influence not only the rate of reaction between the sulphur dioxide and magnesium hydroxide but also the sulphur dioxide gas pressure over the resultant liquor, the said pressure being a factor of considerable importance in the present operation. Other variables to be considered are the concentration of the liquor required and the concentration of sulphur dioxide in the entering gas.

With the usual gas velocities practicable in the towers employed in this invention, i.e. velocities between 700 and 1300 f.p.m. (feet per minute), and with liquid velocities up to about 75 U.S. g.p.m. (U.S. gallon per minute), the invention can be carried out at temperatures within a fairly wide range, from about 70° F. to about 190° F., and with liquor concentrations from about 4% to about 14%, based on total $SO_2$. By temperature of the operation we understand the temperature of the liquor issuing from the tower. This temperature will be the resultant of several factors, such as the temperature of the inlet gas, the temperature of the inlet liquid, the heat of reaction, etc.; it is obviously possible to coordinate the temperatures of those various factors so as to obtain such a temperature of the liquid at the exit of the tower which is desirable.

It is preferred to carry out the operation in conditions such that a liquor of required concentration be formed in a single pass of the absorbing liquid (i.e. the magnesium hydroxide slurry) through the tower, without a need for recirculation; operation in such manner will result in greatest throughput and, hence, best utilization of tower capacity. We have found that, when using burner gas, i.e. gas obtained by burning sulphur to sulphur dioxide, the operation can be carried out in the preferred manner when the temperature is within the range of about 135–180° F. and the liquor concentration is maintained within the range of about 5–10% total $SO_2$. When using gas which has a low $SO_2$ content i.e. between about 0.5 and about 2% the temperature is preferably between 120–160° F. In these conditions excellent efficiency of gas recovery is achieved, the exit gas having an $SO_2$ content which is very low or substantially nil, and no recirculation of the liquid through the tower proves necessary. The favourable effect of operating within this temperature range was unexpected. What could be expected, on the contrary, was that higher temperatures, such as in the above stated range, would increase the sulphur dioxide gas pressure over the bisulphite solution and thus tend to decrease the partial pressure driving force, thereby (despite the simultaneous increase in the rate of reaction between the $SO_2$ and $Mg(OH)_2$ adversely affecting the overall efficiency of absorption. This adverse effect was expected to show itself particularly in the case where dilute gas, e.g., gas from a recovery furnace was used. It was therefore unexpected, and most beneficial, to find a range of temperatures, namely the preferred temperature range above defined, within which the effect of higher temperature is, on balance, favourable.

The concentration of the bisulphite liquor formed in the tower also has an influence on the efficiency of absorption. Ordinarily, bisulphite liquor for pulping is required in concentrations of about 4% $SO_2$. We have found that we can increase the efficiency of absorption by preparing a liquor of higher concentration, preferably of the order of 5–10%. Liquors of higher concentration, e.g., of the order of 13–14% can also be prepared, but at such high concentrations, particular care should be taken lest the equilibrium be disturbed, as precipitation of the monosulphite may suddenly start even on a very slight change in conditions, such as pH, temperature, etc.

It is believed that the favourable effect of higher concentration in the process of the present invention is related to the feature of a countercurrent flow of the two fluids being maintained through the reaction zone. When sulphur dioxide and magnesium hydroxide flow in countercurrent, the monosulphite is first formed by the reaction.

$$Mg(OH)_2 + H_2SO_3 \rightleftharpoons MgSO_3 + 2H_1O \qquad (1)$$

and then, on further contact with the gas, the bisulphite is formed, substantially in accordance with the equilibrium equation:

$$MgSO_3 + H_2SO_3 \rightleftharpoons Mg(HSO_3)_2 \qquad (2)$$

where the $H_2SO_3$ is simultaneously in equilibrium according to:

$$H_2SO_3 \rightleftharpoons SO_2 + H_2O \qquad (3)$$

Higher concentrations of $MgSO_3$ will tend to drive Equation 2 in the direction of the formation of bisulphite which has the desirable effect of decreasing the pressure of free $SO_2$. The opposite effect would result if cocurrent flow were used, as the bisulphite would then be formed in greater concentrations, driving the reaction in the direction where monosulphite and free sulphurous acid are formed, thus increasing the pressure of $SO_2$ and lowering the efficiency.

In order to ensure as complete an absorption of the $SO_2$ as possible, it is desirable to produce a bisulphite liquor which contains a certain relatively low, amount of monosulphite. This will be particularly important when operating with gases of low $SO_2$ content, e.g., gases from the recovery furnace. The amount of monosulphite present in the bisulphite liquor will, naturally, be held to a proportion low enough to avoid precipitation in the operating conditions of temperature, etc. The conversion of this relatively small amount of monosulphite to bisulphite, if desired, may be effected, e.g., by means of digester relief gases (i.e. the gas and steam allowed to escape from the digester to reduce the pressure therein) or gas from any other source. The liquor obtained from the tower can, naturally, be adjusted to any pH desired in the process by known means.

It will be appreciated that with the gas and liquid velocities used in the practice of this invention it may not be possible in certain circumstances to provide adequate liquid loading for the proper balance between gas and liquid in the absorption zone. For instance, when gas of low $SO_2$ concentration, such as gas from a recovery furnace, is used for liquor making, if the stoichiometric ratio between $SO_2$ and $Mg(OH)_2$ is to be maintained, the liquid ratio will generally be too low for the usual gas velocities and effective absorption can not be maintained. To ensure the proper liquid rate through the tower (while maintaining the required concentration of bisulphite in the final liquor), it will be necessary in these circumstances to recirculate a portion of the liquor from the bottom of the tower back through the tower. The efficiency of absorption of the gas in the liquid will depend on the $SO_2$ gas pressure of the solution in the following manner: The absorption can be represented by the formula $M = K \times V \times \Delta P$, where M is the quantity of gas absorbed in mols per unit time, V is a constant of the tower (volume of packing). $\Delta P$ is the partial pressure driving force, and K is a constant. The partial pressure driving force can be generally represented as the average difference between the $SO_2$ pressure in the gas and the $SO_2$ pressure of the bisulphite solution. Clearly, the lower the $SO_2$ pressure of the solution, the greater the driving force, and consequently (other factors remaining unchanged) the transfer of gas.

Experience has shown that when recirculation is used, particularly at lower temperatures and concentrations (as above discussed), there occurs a very considerable drop in the efficiency of absorption of the gas in the liquid: less gas is absorbed at given velocities during the passage through the tower and substantial loss of unabsorbed gas to the atmosphere occurs.

We have found that the efficiency of absorption of the gas in such circumstances will be maintained at the usual high level if steps are taken to ensure that an appropriate time interval elapses between the moment the liquor is collected at the bottom of the tower and the moment a portion of it to be recirculated is returned to the top of the tower for another passage therethrough in countercurrent to the gas. We shall call this time interval "residence time."

Thus, a "residence time" of suitable duration must be provided for the liquor coming out of the tower before recirculation of a portion of it is attempted. Where the operation is continuous, as is the case with the apparatus and method described, an appropriate "residence time" can be provided by so proportioning the volume of the receiving vessel at the bottom of the tower; in relation to the flow into and out of said vessel, that the liquor will remain in the vessel for a predetermined average length of time.

While this invention is not predicated on any particular explanation of the necessity for "residence time," the following is believed to be an interpretation of the occurring phenomena. When the sulphur dioxide gas is absorbed in magnesium hydroxide slurry by the method as herein described, the velocities of the gas being of the order of 1,200 f.p.m. or thereabout and the liquid rates being up to 75 U.S. g.p.m. per sq. ft., the absorption occurs at such a high rate that a considerable lag develops between the physical absorption of the gas and its chemical reaction with the base which follows upon the physical absorption. The gas thus remains for a time as molecular $SO_2$ dissolved in the liquid, and it only subsequently reacts with water to form sulphurous acid, which in turn, reacts with the monosulphite to form the bisulphite according to the reactions:

$$(SO_2) \longrightarrow (SO_2) \quad (4)$$
Molecular in gas phase → Molecular in aqueous solution $$(SO_2) + H_2O \longrightarrow H_2SO_3 \quad (5)$$
Molecular in aqueous solution $$H_2SO_3 + MgSO_3 \longrightarrow Mg(HSO_3)_2 \quad (6)$$

Reaction (5), being the slowest, is the controlling reaction.

The sulphur dioxide pressure over the liquid containing dissolved molecular gas will normally be considerably higher than the gas pressure over the solution of the sulphite and bisulphite, i.e., over the liquid after the reaction has taken place. When the liquid containing dissolved unreacted gas is recirculated, its gas pressure contributes markedly to a lowering of the partial pressure driving force, which in turn, as explained with reference to the absorption formula hereinabove, lowers the efficiency of operation. By allowing sufficient "residence time" for the reaction substantially to occur, this adverse factor is eliminated.

The "residence time" needed will be largely dependent on the temperature. For example, the reaction between sulphur dioxide and magnesium hydroxide at a temperature of about 80° F. will take, for all practical purposes, about 6 minutes, whereas the time needed at about 100° F. is reduced to about 3 minutes. Hence, operation at temperatures above ordinary temperature will generally result in more efficient absorption, and will also cut down on the "residence time" needed.

A particular feature of the process of this invention is that it involves addition of the magnesium hydroxide slurry at a single point in the system—unlike prior art systems in which magnesium hydroxide must be mixed at successive points with formed bisulphite solutions.

For efficient operation of the tower, I have found it desirable, in certain cases, to provide a means of cooling the exit gas at the top of the tower, e.g., by spraying cold water into the gas close to the point of exit. The purpose of this water wash is to reduce the speed of the exit gases, to prevent entrainment of liquid particles, and to recover whatever heat can still be recovered from the gas.

The invention will now be briefly described with reference to the single figure of the drawing, where, as an example, a particular embodiment of the invention is illustrated.

The numeral 1 denotes a tower of the type described in the copending application referred to hereinabove. Grids 8, of large open area, divide the tower into several segments each, constituting a zone of contact. In each of these zones are placed a number of lightweight spherical elements, e.g., hollow polyethylene plastic spheres. The spheres are shown in the figure as being supported by the grid, which will be the case when the tower is not operating. The spheres occupy generally less than half the space of each zone. An aqueous slurry of magnesium hydroxide is introduced at 6 at the top or upper section of the tower and allowed to flow by gravity in counter-current to the gas which enters at 3 above the level of the collected liquor and rises to the top of the tower toward exit 9. The velocities of the liquid and the gas are such that spheres 2 will be lifted from the static position on the grids and will be caused to travel at random within the space confined by the grids and walls of the tower thereby increasing the turbulence and improving the intimate contact between the liquid and the gas. The liquor is collected in receiver tank 4, whence part of it is sent to process and part may be recirculated, if recirculation is required. The recirculated portion is conducted through line 5, in which may be inserted cooler 14, back to the top of the tower where it reenters at 10 which is preferably at a level in the tower lower than 6. (If the recirculated portion is relatively small, it can also be mixed directly with the fresh liquor and introduced with it at 6, provided the back pressure in the recirculated liquor is negligible or the loss of gas resulting from such back pressure is economically insignificant.) The receiver tank 4 will be so proportioned in relation to the rate of flow into it at 11 and out of it at 12, to allow for the necessary "residence time" for the reaction to run substantially to completion. A water spray may be provided at 13, above the point of entry of the slurry, for spraying cold water onto the exit gases to reduce the gas volume and speed and reduce liquid entrainment.

While it is preferred to use a plurality of zones in series as above described, it is evident that a single zone properly designed may be used. Preferably, there are at least 2 zones in series in the tower.

EXAMPLE

Magnesium bisulphite cooking liquor was prepared at a paper mill by absorption of sulphur dioxide gas in magnesium hydroxide in the tower, as hereinabove described. The gas was prepared by burning sulphur in a rotary burner to which molten sulphur was supplied through a level controlled valve. The hot burner gas from the combustion chamber was cooled to give a saturated gas at about 160° F. by passing it through a spray cooler, the water from the cooler being available for the subsequent dilution of the cooking liquor if required. The magnesium hydroxide was prepared by slurrying the dry oxide in a mixing tank, the slurry was stored in agitated storage tanks, and pumped from the storage tank to the absorption tower through a magnetic flowmeter with recorder. On the way to the absorption tower the slurry is premixed with water and steam, the resulting suspension as it is fed to the tower having approximately 6% solids and at about 110°–120° F.

The apparatus used was a tower 2 ft. in diameter and 20 ft. in height, installed on a sump tank 5 ft. in diameter by 6 ft. high. The tower consisted of 4 stages, each 4 ft. high, and each containing hollow plastic spheres 1½ inches in diameter piled up to a height of 15 inches. To avoid liquid carryover to the fan, the magnesium hydroxide slurry was added not to the top zone but the next lower one, while to the top zone was added fresh water; this arrangement not only prevented liquid entrainment by the exit gases but also cooled the exit gas to the extent of permitting the recovery of heat equivalent to about 2,500 lbs. of steam per ton of sulphur burnt. The acid as produced in the tower was at a temperature of 140–160° F. and contained 7–8% total $SO_2$. The conditions are summarized in Table I. The acid produced was diluted to approximately 6.8% total $SO_2$ in the sump tank by the addition of water (or effluent from the spray coolers). A pH meter continuously recorded the pH of the acid in the sump tank.

Table II shows typical results obtainable when operating the present invention with low $SO_2$ content gas, i.e., from a recovery furnace. Comparing runs No. 1, 2 and 3 carried out at 80, 144 and 154° F. respectively, it can be seen that at higher temperatures the efficiency is improved. Run No. 1 at 80° F. maintained a higher monosulphite concentrate and still the efficiency was low.

Run No. 4 at 130° F. and a monosulphite content of .34 operated with 86% efficiency while run No. 5 at 134° F. and a monosulphite content of .06 (substantially a true bisulphite) operated with only 76.1% efficiency.

The efficiency may be improved particularly when forming a true bisulphite by recirculation of the liquor as evidenced by runs No. 6 and 7.

We claim:
1. A process of preparing a magnesium bisulphite pulping liquor comprising continuously introducing into a reaction zone sulphur dioxide containing gas at a point in the lower region thereof, introducing directly into said zone magnesium hydroxide slurry at a point in the upper region thereof, causing said gas and said slurry to flow in mutual intimate contact through said zone in countercurrent flow, producing turbulence in the flow of said gas and said slurry in said reaction zone by the random movement of a multiplicity of elements during the absorption of sulphur dioxide in said slurry and reaction therebetween, said reaction being preponderantly one between magnesium hydroxide and sulphur dioxide to form magnesium monosulphite in the upper region of said zone and preponderantly one between magnesium monosulphite and sulphur dioxide to form magnesium bisulphite in the lower region of said zone, said turbulence being great enough to substantially prevent formation of deposits of magnesium monosulphite and collecting magnesium bisulphite liquor from said lower region of said zone.

2. The method as claimed in claim 1 wherein at least a portion of said collected liquor is returned to said zone at a point lower than the point of introduction of magnesium hydroxide slurry.

3. The method as claimed in claim 1, wherein the temperature of the liquor is between 135° and 180° F.

4. The method as claimed in claim 1 wherein the concentration of the magnesium bisulphite liquor is between 4% and 14% in terms of total $SO_2'$ 5. The method as claimed in claim 1 wherein the sulphur dioxide content of the gas is between 0.5 and 2%.

6. The method as claimed in claim 5 wherein the temperature of the liquor is between 120 and 160° F.

TABLE I

| Feed to Tower | | | Inlet Gas | | | Exit Gas | | Tower Acid | | | | $SO_2$ Pick-up | |
|---|---|---|---|---|---|---|---|---|---|---|---|---|---|
| Liquid Slurry Rate (U.S. gal./min./sq. ft.) | Solids | Temp., °F. | Velocity (f.p.m.) | Percent $SO_2$ | Temp., °F. | Percent $SO_2$ | Temp., °F. | Temp., °F. | Percent $SO_2$ | | | Lbs./hr. | Lbs./hr./sq. ft. |
| | | | | | | | | | Total | Free | Comb. | | |
| 21.4 | 4.45 | 111 | 920 | 17.5 | 161 | 0.0 | 130 | 156 | 8.36 | 4.22 | 4.14 | 2,970 | 950 |
| 22.2 | 3.67 | 120 | 840 | 17.0 | 162 | 0.2 | 106 | 162 | 6.88 | 3.30 | 3.58 | 2,400 | 764 |

TABLE II

| Run No. | Mg(OH)₂ Slurry | | Recirc. Liquor | | Inlet Gas | | | Exit Gas | | Product Liquor | | | | | Recovery Effic., Percent |
|---|---|---|---|---|---|---|---|---|---|---|---|---|---|---|---|
| | Flow, U.S. g.p.m. | Temp., °F. | Flow, U.S. g.p.m. | Temp., °F. | Flow, c.f.m. | Temp., °F. | $SO_2$ Percent | Temp., °F. | $SO_2$ Percent | Temp., °F. | pH | Percent $SO_2$ | | | |
| | | | | | | | | | | | | Total | Free | Comb. | |
| 1 | 1.5 | 92 | 0 | | 820 | 88 | 1.07 | 88 | 0.40 | 80 | | 4.80 | 2.20 | 2.60 | 62.6 |
| 2 | 1.7 | 94 | 0 | | 840 | 145 | 1.13 | 144 | 0.081 | 144 | | 6.06 | 2.80 | 3.26 | 91.3 |
| 3 | 1.7 | 95 | 0 | | 910 | 155 | 1.10 | 153 | 0.069 | 154 | | 5.89 | 2.70 | 3.19 | 92.1 |
| 4 | 3.4 | 72 | 0 | | 750 | 129 | 3.00 | 130 | .415 | 130 | 4.38 | 7.54 | 3.60 | 3.94 | 86.0 |
| 5 | 1.8 | 60 | 0 | | 850 | 142 | 1.37 | 139 | 0.33 | 134 | 4.10 | 6.02 | 2.98 | 3.04 | 76.1 |
| 6 | 1.9 | 71 | 15.1 | 134 | 810 | 136 | 1.52 | 134 | 0.07 | 134 | 4.11 | 6.21 | 3.08 | 3.13 | 95.5 |
| 7 | 1.5 | 52 | 15.1 | 144 | 810 | 147 | 0.94 | 143 | 0 | 144 | 4.88 | 5.54 | 2.42 | 3.12 | 100 |

References Cited

UNITED STATES PATENTS

| 1,192,640 | 7/1916 | Jardine | 23—130 |
| 2,351,780 | 6/1944 | Palmrose | 23—130 |
| 2,572,929 | 10/1951 | Hazelquist | 23—130 |
| 3,122,594 | 2/1964 | Kielback | 23—2 XR |
| 3,273,961 | 9/1966 | Rogers et al. | 23—131 |

OSCAR R. VERTIZ, *Primary Examiner.*

BENNETT H. LEVENSON, *Assistant Examiner.*